(12) United States Patent
Newell et al.

(10) Patent No.: US 12,385,521 B1
(45) Date of Patent: Aug. 12, 2025

(54) FLEXURE ASSEMBLY

(71) Applicant: CAES SYSTEMS LLC, Arlington, VA (US)

(72) Inventors: Christopher Newell, Merrimack, NH (US); Bruce Edward Kaczmarek, Largo, FL (US)

(73) Assignee: CAES Systems LLC, Arlington, VA (US)

( * ) Notice: Subject to any disclaimer, the term of this patent is extended or adjusted under 35 U.S.C. 154(b) by 218 days.

(21) Appl. No.: 18/298,883

(22) Filed: Apr. 11, 2023

(51) Int. Cl.
*F16C 11/12* (2006.01)
*G02B 7/182* (2021.01)

(52) U.S. Cl.
CPC ............ *F16C 11/12* (2013.01); *G02B 7/1822* (2013.01); *F16C 2226/50* (2013.01); *Y10T 403/54* (2015.01)

(58) Field of Classification Search
CPC ...... F16C 11/12; Y10T 403/45; Y10T 403/54; G02B 7/1821; G02B 7/1822
See application file for complete search history.

(56) References Cited

U.S. PATENT DOCUMENTS

| | | | | |
|---|---|---|---|---|
| 6,146,044 A | * | 11/2000 | Calvet | F16C 11/12 403/291 |
| 6,479,782 B1 | * | 11/2002 | Blackburn | B23H 9/00 29/434 |
| 7,595,944 B2 | * | 9/2009 | Huang | G02B 7/026 381/396 |
| 8,240,941 B2 | * | 8/2012 | Kibel | G02B 7/003 403/291 |
| 11,473,616 B2 | * | 10/2022 | Bullard | F16C 11/12 |
| 2014/0247440 A1 | * | 9/2014 | Yamada | G01S 7/481 359/200.7 |

FOREIGN PATENT DOCUMENTS

DE  196 10 692  * 9/1997 ............. F16C 11/12

* cited by examiner

*Primary Examiner* — Michael P Ferguson
(74) *Attorney, Agent, or Firm* — Alston & Bird LLP (57) ABSTRACT

A flexure assembly includes a first spiral flexure, a second spiral flexure, and a spacing element. The spacing element is positioned between the first spiral flexure and the second spiral flexure. The flexure assembly also includes a plurality of fasteners that collectively extend circumferentially around an axis defined by the flexure assembly. Each of the plurality of fasteners extends through the first spiral flexure and the second spiral flexure.

18 Claims, 6 Drawing Sheets

FLEXURE ASSEMBLY

TECHNICAL FIELD

The present application relates generally to a flexure assembly. More specifically, the present application relates to a flexure assembly that is provided to accommodate for thermal expansion of materials of two adjacent components or assemblies.

BACKGROUND

Apparatuses, such as gimbal assemblies, are often made with materials that change shape or volume in response to a change in temperature. More specifically, most materials expand with an increase in temperature and contract with a decrease in temperature. Gimbal assemblies often include a payload assembly and a yoke assembly that are manufactured from different materials which may have different coefficients of thermal expansion. A change in temperature may adversely affect the geometric shape of the payload assembly in relation to the yoke assembly, which may be detrimental.

Flexure assemblies are often provided between components with different coefficients of thermal expansion. However, for certain applications, such as gimbal assemblies, it is desirable for the gimbal assembly to support the payload assembly in a rigid manor. More specifically, it is desirable for a flexure assembly, for certain applications, such as for gimbal assemblies, to maximize the amount of torsional and radial stiffness and minimize the amount of axial stiffness. Some conventional flexure assemblies, however, do not provide adequate torsional and radial stiffness for certain applications, such as for gimbal assemblies. Through applied effort, ingenuity, and innovation, many of these identified deficiencies and problems with conventional flexure assemblies have been solved by developing solutions that are structured in accordance with the embodiments of the present disclosure, many examples of which are described in detail herein.

BRIEF SUMMARY

In general, embodiments of the present disclosure provided herein include apparatuses to provide for improved accommodation of thermal expansion of materials of two adjacent components or assemblies. At least one of the components or assemblies may be configured to rotate and a flexure assembly of the present disclosure may be provided to accommodate the thermal expansion of materials of the rotatable component or assembly and/or the adjacent component or assembly.

In various aspects, a flexure assembly is provided that defines an axis. The axis can define an axial direction, a circumferential direction, and a radial direction. The flexure assembly can include a first spiral flexure, a second spiral flexure, a spacing element, and a plurality of fasteners. The spacing element can be positioned between the first spiral flexure and the second spiral flexure.

In various examples, the first spiral flexure and the second spiral flexure can include a plurality of slots. Each of the plurality of slots of the first spiral flexure and the second spiral flexure can be nonlinear. For example, each of the plurality of slots of the first spiral flexure and the second spiral flexure can be arc shaped. Each of the plurality of slots can have a tilted configuration relative to the radial direction. The first spiral flexure can define a radius that extends from the axis to an outer rim of the first spiral flexure. Each of the plurality of slots of the first spiral flexure can define a width. A ratio (R:W) between the radius of the first spiral flexure and the width can be at least 5:1 and up to 14:1.

In various examples, the first spiral flexure and the second spiral flexure are oriented within the flexure assembly such that they are counterposed.

In various examples, the plurality of fasteners can, collectively, extend circumferentially around the axis and each of the plurality of fasteners can extend through the first spiral flexure and the second spiral flexure. In various examples, the plurality of fasteners is a first plurality of fasteners and each of the first plurality of fasteners can extend through a radially outer portion of the first spiral flexure and a radially outer portion of the second spiral flexure. The flexure assembly can include a second plurality of fasteners that collectively extend circumferentially around the axis extend through a radially inner portion of the first spiral flexure and a radially inner portion of the second spiral flexure.

In various examples, the flexure assembly includes a first plate and a second plate. The first spiral flexure and the second spiral flexure can be positioned between the first plate and the second plate. The first plate can be configured to move in the axial direction relative to the second plate. Each of the first plurality of fasteners can extend through either the first plate or the second plate, but not both, and each of the second plurality of fasteners can extend through the other of the first plate or the second plate, but not both.

In various examples, the spacing element is a first spacing element that is positioned between an inner portion of the first spiral flexure and an inner portion of the second spiral flexure. The flexure assembly can include a second spacing element that is positioned between an outer portion of the first spiral flexure and an outer portion of the second spiral flexure. The first spacing element can be configured to move relative to the second spacing element.

In various aspects, a gimbal assembly is provided. The gimbal assembly can include a payload assembly, a yoke assembly, and a flexure assembly. The payload assembly can be rotatably coupled to the yoke assembly. The flexure assembly can be positioned between the payload assembly and the yoke assembly. The flexure assembly can define an axis. The axis can define an axial direction, a circumferential direction, and a radial direction. The flexure assembly can include a first spiral flexure, a second spiral flexure, a spacing element, and a plurality of fasteners. The spacing element can be positioned between the first spiral flexure and the second spiral flexure.

In various examples, the first spiral flexure and the second spiral flexure can include a plurality of slots. Each of the plurality of slots of the first spiral flexure and the second spiral flexure can be nonlinear. For example, each of the plurality of slots of the first spiral flexure and the second spiral flexure can be arc shaped. Each of the plurality of slots can have a tilted configuration relative to the radial direction. The first spiral flexure can define a radius that extends from the axis to an outer rim of the first spiral flexure. Each of the plurality of slots of the first spiral flexure can define a width. A ratio (R:W) between the radius of the first spiral flexure and the width can be at least 5:1 and up to 14:1.

In various examples, the first spiral flexure and the second spiral flexure are oriented within the flexure assembly such that they are counterposed.

In various examples, the plurality of fasteners can, collectively, extend circumferentially around the axis and each of the plurality of fasteners can extend through the first spiral flexure and the second spiral flexure. In various examples, the plurality of fasteners is a first plurality of fasteners and each of the first plurality of fasteners can extend through a radially outer portion of the first spiral flexure and a radially outer portion of the second spiral flexure. The flexure assembly can include a second plurality of fasteners that collectively extend circumferentially around the axis extend through a radially inner portion of the first spiral flexure and a radially inner portion of the second spiral flexure.

In various examples, the flexure assembly includes a first plate and a second plate. The first spiral flexure and the second spiral flexure can be positioned between the first plate and the second plate. The first plate can be configured to move in the axial direction relative to the second plate. Each of the first plurality of fasteners can extend through either the first plate or the second plate, but not both, and each of the second plurality of fasteners can extend through the other of the first plate or the second plate, but not both.

In various examples, the spacing element is a first spacing element that is positioned between an inner portion of the first spiral flexure and an inner portion of the second spiral flexure. The flexure assembly can include a second spacing element that is positioned between an outer portion of the first spiral flexure and an outer portion of the second spiral flexure. The first spacing element can be configured to move relative to the second spacing element.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, the term "positioned directly on" refers to a first component being positioned on a second component such that they make contact. Similarly, as used herein, the term "positioned directly between" refers to a first component being positioned between a second component and a third component such that the first component contacts both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

Figure 1:
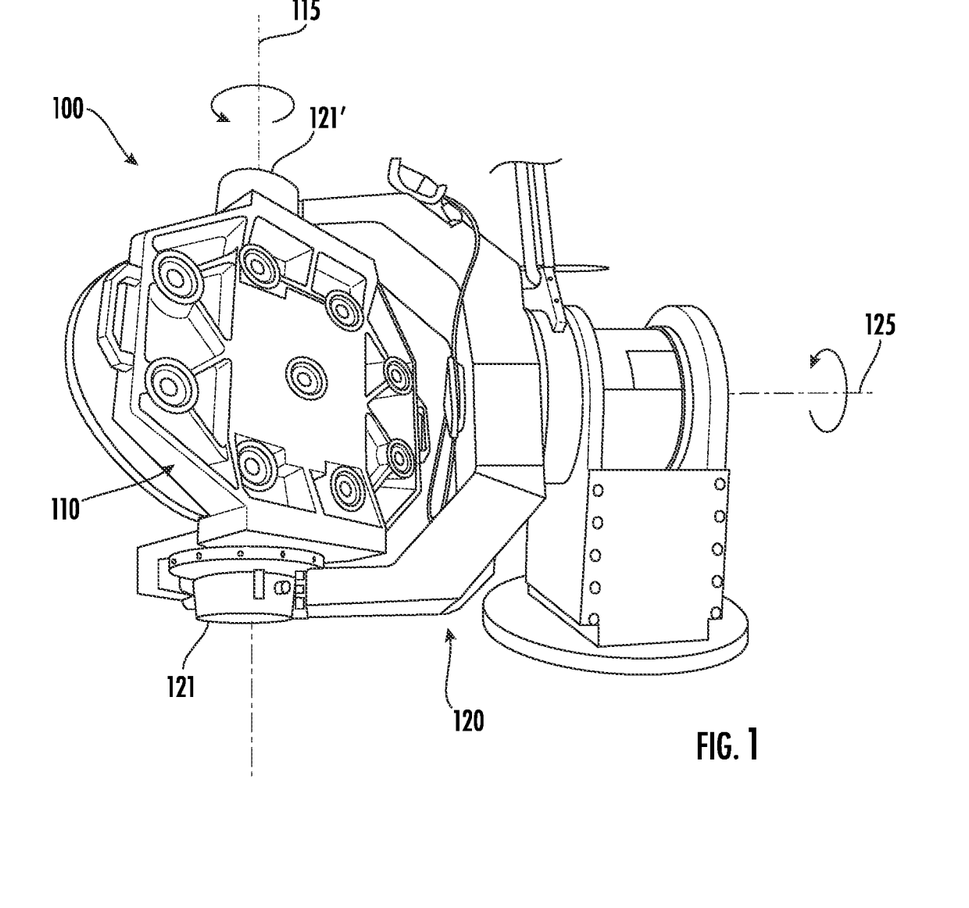
FIG. 1 provides a perspective view of a gimbal assembly, in accordance with an example embodiment.

Referring now to FIG. 1, a perspective view of a gimbal assembly 100 is provided, in accordance with an example embodiment. The gimbal assembly 100 can include a payload assembly 110 and a yoke assembly 120. The payload assembly 110 can be configured to rotate on a payload assembly axis 115 and the yoke assembly 120 can be configured to rotate on a yoke assembly axis 125. The payload assembly 110 can be rotatably coupled to the yoke assembly 120. As such, the payload assembly 110 can also rotate on the yoke assembly axis 125.

The payload assembly 110 can be configured to be coupled to optical equipment (not shown). For example, the payload assembly 110 can be configured to be coupled to a telescope assembly or an optical tracking system. However, in various other examples, the payload assembly 110 can be configured to be coupled to various other types of machines or equipment.

The payload assembly 110, or at least some components thereof, can be manufactured from a first material and the yoke assembly 120, or at least some components thereof, can be manufactured from a second material. The first material of the payload assembly 110 can be the same material as the second material of the yoke assembly 120. However, in various other examples, the first material of the payload assembly 110 is a different material than the second material of the yoke assembly 120. In various examples, one of the first material or the second material comprises aluminum and the other of the first material or the second material comprises a composite material, such as a carbon fiber composite material.

The first material of the payload assembly 110 and the second material of the yoke assembly 120 may expand and/or contract in response to a change in temperature. In various examples, the first material of the payload assembly 110 has the same thermal coefficient of expansion as the second material of the yoke assembly 120. In various other examples, the first material of the payload assembly 110 has a different thermal coefficient of expansion as the second material of the yoke assembly 120.

As will be appreciated, because of the expansion or contraction of the first material and/or the second material, the distances between various components of the payload assembly 110 and the yoke assembly 120 may decrease or increase as the temperature of the first material and the second material changes. The change in the distance between the various components of the payload assembly 110 and the yoke assembly 120 may result in components making undesirable contact with each other, material fatigue, distortion of components of the gimbal assembly 100, and/or damage to components of the gimbal assembly 100. Therefore, an apparatus to allow for thermal expansion and contraction may be beneficial to reduce these undesirable effects. Additionally, for gimbal assembly 100, it may also be beneficial for the apparatus that allows for thermal expansion and contraction to limit the amount of circumferential and radial movement, while allowing axial movement to allow for the thermal expansion and contraction.

Figure 2:
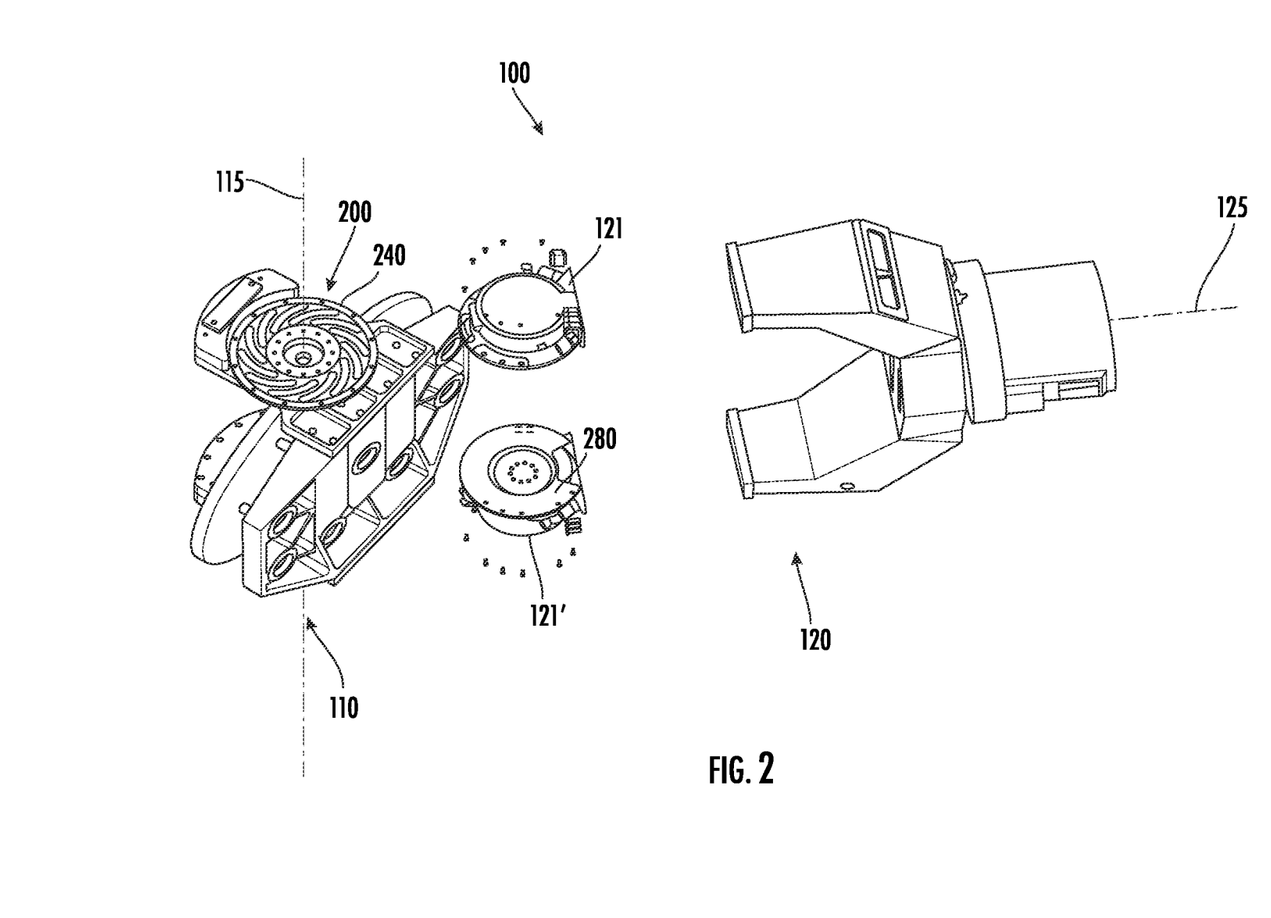
FIG. 2 provides an exploded, perspective view of the gimbal assembly of FIG. 1, in accordance with an example embodiment.

Referring now to FIG. 2, an exploded, perspective view of the gimbal assembly 100 of FIG. 1 is provided, in accordance with an example embodiment. The gimbal assembly 100 can further include one or more flexure assemblies 200 that are each positioned between the yoke assembly 120 and the payload assembly 110. In the example of FIG. 1 and FIG. 2, the gimbal assembly 100 includes only one flexure assembly 200. However, in various other examples, the gimbal assembly 100 includes two flexure assemblies 200. For example, each flexure assembly 200 can be positioned on opposite ends of the payload assembly 110 along the payload assembly axis 115. The flexure assembly 200 may allow for thermal expansion and contraction of the various components of the payload assembly 110 and/or the yoke assembly 120 and may reduce material fatigue, distortion of components, and or damage to components of the gimbal assembly. The flexure assembly 200 may allow for the payload assembly 100 to move axially on the payload assembly axis 115 in relation to the yoke assembly 120 when thermally contracting or expanding. The flexure assembly 200 may also prevent the payload assembly 100 from moving radially and circumferentially on the payload assembly axis 115 in relation to the yoke assembly 120 when thermally contracting or expanding. For gimbal assemblies 100, preventing the radial and circumferential movement of the payload assembly 100 in response to thermal expansion and contraction may be beneficial because the equipment that is coupled to the payload assembly 110, such as optical equipment, may require precise positioning that may be negatively affected by radial and circumferential movement of the payload assembly 100 that is caused by thermal expansion and contraction.

In various examples, the yoke assembly 120 can include a first mount assembly 121 and a second mount assembly 121'. One or both of the mount assemblies 121, 121' of the yoke assembly 120 can be configured to be indirectly coupled to the payload assembly 110 through a flexure assembly 200. Each of the one or more flexure assemblies 200 can be configured to allow for thermal expansion and contraction of the first material of the payload assembly 110 and/or the second material of the yoke assembly 120. For example, the flexure assemblies 200 may allow for the payload assembly 110 to move along the payload assembly axis 115 in relation to the yoke assembly 120.

As discussed, the gimbal assembly 100 may include only one flexure assembly 200. For example, and as depicted in FIG. 2, a single flexure assembly 200 is positioned between the first mount assembly 121 and the payload assembly 110 along the payload assembly axis 115. The second mount assembly 121' is coupled to the payload assembly 110 without a flexure assembly 200 being positioned between the second mount assembly 121' and the payload assembly 110, in various examples. As such, a distance between the payload assembly 110 and the first assembly 121 may increase and/or decrease when thermally expanding and/or contracting, whereas a distance between the payload assembly 110 and the second assembly 121' may not increase and/or decrease when thermally expanding and/or contracting. In various contexts, such as in the context of a gimbal assembly 100, this configuration may increase the positioning precision of equipment, such as optical equipment, that is coupled to the payload assembly because the payload assembly 110 is prevented from oscillating along the payload assembly axis 115.

Figure 3:
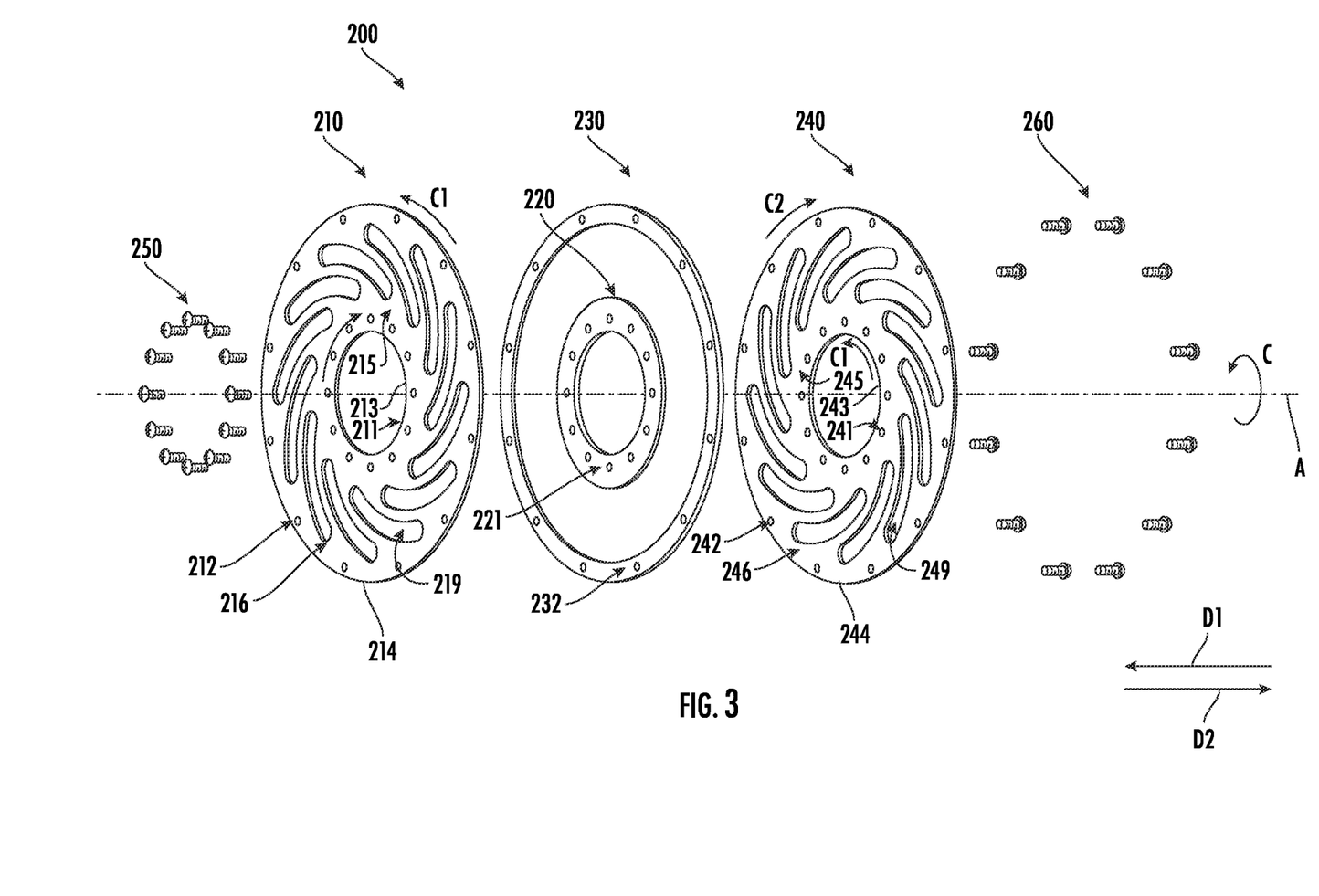
FIG. 3 provides an exploded, perspective view of a flexure assembly, in accordance with an example embodiment.

Referring now to FIG. 3, an exploded, perspective view of a flexure assembly 200 is provided, in accordance with an example embodiment. The flexure assembly 200 can define an axial axis A. The axial axis A can be the same axis as the payload assembly axis 115 of FIG. 1 and FIG. 2. The axis A can define a circumferential direction C around the axis A and radial directions that extend from the axis A. Also, the axis A can define a first axial direction D1 and a second axial direction D2 that extend in opposite directions.

The flexure assembly 200 can include a first spiral flexure 210 and a second spiral flexure 240. The flexure assembly 200 can include a first spacing element 220 and a second spacing element 230 that are each positioned between the first spiral flexure 210 and the second spiral flexure 240. In various examples, the flexure assembly 200 includes the first spacing element 220 or the second spacing element 230, but not both. The first spiral flexure 210, the second spiral flexure 240, the first spacing element 220, and the second spacing element 230 can each have a cross-sectional, annular shape.

The first spiral flexure 210 can have an outer rim 214 that is a surface of the first spiral flexure 210 that is furthest from the axis A and an inner rim 213 that is a surface of the first spiral flexure 210 that is closest to the axis A. The first spiral flexure 210 can have an inner portion 215 that is the portion of the first spiral flexure 210 that is closer to the inner rim 213 than the outer rim 214. The first spiral flexure 210 can have an outer portion 216 that is the portion of the first spiral flexure 210 that is closer to the outer rim 214 than the inner rim 213. Similarly, the second spiral flexure 240 can have an outer rim 244, an inner rim 243, an inner portion 245, and an outer portion 246 that are configured similarly to, or the same as the outer rim 214, the inner rim 213, the inner portion 215, and the outer portion 216 of the first spiral flexure 210, respectively.

The first spiral flexure 210 can include a first plurality of fastener holes 211 that, collectively, extend circumferentially around the axis A. The first spiral flexure 210 can have a second plurality of fastener holes 212 that, collectively, extend circumferentially around the axis A. Each of the first plurality of fastener holes 211 of the first spiral flexure 210 can extend through the inner portion 215 of the first spiral flexure 210 and each of the second plurality of fastener holes 212 can extend through the outer portion 216 of the first spiral flexure 210. Similarly, the second spiral flexure 240 can include a first plurality of fastener holes 241 and a second plurality of fastener holes 242 that are configured the same as, or similar to, the first plurality of fastener holes 211 and the second plurality of fastener holes 212 of the first spiral flexure 210, respectively.

The first spacing element 220 can include a plurality of fastener holes 221 that, collectively, extend circumferentially around the axis A. The second spacing element 230 can include a plurality of fastener holes 221 that, collectively, extend circumferentially around the axis A. Each of the plurality of fastener holes 221 of the first spacing element 220 can be aligned with a corresponding fastener hole 221 of the first plurality of fastener holes 211 of the first spiral flexure 210 and a corresponding fastener hole 241 of the first plurality of fastener holes 241 of the second spiral flexure 240. Each of the plurality of fastener holes 232 of the second spacing element 230 can be aligned with a corresponding fastener hole of the second plurality of fastener holes 212 of the first spiral flexure 210 and a corresponding fastener hole of the second plurality of fastener holes 242 of the second spiral flexure 240.

As will be discussed further, the first spiral flexure 210 can include a plurality of slots 219. Each of the slots 219 can extend from the inner portion 215 of the first spiral flexure 210 to the outer portion 216 of the first spiral flexure 210. Similarly, the second spiral flexure 240 can include a plurality of slots 249 that can each extend from the inner portion 245 of the second spiral flexure 240 to the outer portion 246 of the second spiral flexure 240.

In various examples, and as depicted in FIG. 3, the first spiral flexure 210 and the second spiral flexure 240 can be configured the same, or similarly. For example, the first spiral flexure 210 and the second spiral flexure 240 can be the same except for deviations that are within manufacturing tolerances (e.g., features within 30 mil, such as within 15 mil). However, they can be oriented within the flexure assembly 200 such that they are counterposed. For example, the orientation of the second spiral flexure 240 can be the same as the first spiral flexure 210 except that it is flipped 180 degrees on an axis that extends radially from the axis A. Having the orientation of the first spiral flexure 210 counterposed to the orientation of the second spiral flexure 240 has various benefits, which will become apparent with the present disclosure.

The first spiral flexure 210 and the second spiral flexure 240 can each have a thickness that is less than 0.1 inch, such as less than 0.075 inch, such as less than 0.05 inch, such as less than 0.03 inch, such as approximately 0.025 inch (e.g., within manufacturing tolerances, such as within 4 mils, such as within 2 mils). The thickness of the first spiral flexure 210 and the second spiral flexure 240 may be such that the first spiral flexure 210 and the second spiral flexure 240 are flexible. Stated differently, the first spiral flexure 210 and the second spiral flexure 240 may flex under normal operating conditions of the flexure assembly 200.

In various examples, the first spiral flexure 210 and the second spiral flexure 240 can each have a diameter that is at least 5 inches and up to 20 inches, such as at least 5 inches and up to 15 inches, such as at least 7 inches and up to 12 inches, such as at least 9 inches and up to 10 inches. However, the first spiral flexure 210 and the second spiral flexure 240 can have any size diameter. For example, the first spiral flexure 210 and the second spiral flexure 240 may be sized appropriately for the weight, size, or material (e.g., the thermal coefficient of expansion of the material) of the payload assembly 110 and/or the yoke assembly 120, and/or the size or weight of the equipment or machine that is coupled to the payload assembly 110.

The first spiral flexure 210 and the second spiral flexure 240 can each be manufactured from, or include, metal. For example, the first spiral flexure 210 and the second spiral flexure 240 can each be manufactured from metal sheet stock. In various examples, the first spiral flexure 210 and the second spiral flexure 240 are manufactured from, or include, titanium, such as a titanium alloy, such as Ti-6Al-4V alloy. In various examples, the first spiral flexure 210 and the second spiral flexure 240 are manufactured from, or include, stainless steel.

The first spacing element 220 and the second spacing element 230 can be manufactured from, or include, a rigid material. For example, the first spacing element 220 and the second spacing element 230 can be manufactured from, or include, a metal, such as a titanium alloy or stainless steel. The first spacing element 220 and the second spacing element 230 can each have a thickness that is greater than 0.1 inch, such as at least 0.1 inch and up to 2 inches, such as at least 0.1 inch and up to 1 inch, such as at least 0.5 inch and up to 1 inch. The first spacing element 220 and the second spacing element 230 can be rigid and relatively difficult to flex (e.g., will not flex under normal operating conditions of the flexure assembly 200).

Still referring to FIG. 3, the flexure assembly 200 can include a first plurality of fasteners 250 and a second plurality of fasteners 260. Each of the fasteners 250, 260 can be configured to mechanically couple adjacent components. For example, the fasteners 250, 260 can be bolts or rivets. The first plurality of fasteners 250 can extend through the first plurality of fastener holes 211 of the first spiral flexure 210, the plurality of fastener holes 221 of the first spacing element 220, and the first plurality of fastener holes 241 of the second spiral flexure 240. The second plurality of fasteners 260 can extend through the second plurality of fastener holes 242 of the second spiral flexure 240, the plurality of fastener holes 232 of the second spacing element 230, and the second plurality of fastener holes 212 of the first spiral flexure 210.

Notably, in various examples, and as depicted in FIG. 3, the first plurality of fasteners 250 do not extend through the plurality of fastener holes 232 of the second spacing element 230 and the second plurality of fasteners 260 do not extend through the plurality of fastener holes 221 of the first spacing element 220. Additionally, the first spacing element 220 and the second spacing element 230 can be separate components of the flexure assembly 200 and, in various examples, are not directly coupled to each other. Because of this configuration and the flexibility of the first spiral flexure 210 and the second spiral flexure 240, the first spacing element 220 may be allowed to move relative to the second spacing element 230, and vice-versus, in the axial directions D1, D2. For example, the first spacing element 220 and/or the second spacing element 230 may be allowed to move in the first axial direction D1 and/or the second axial direction D2.

Figure 4:
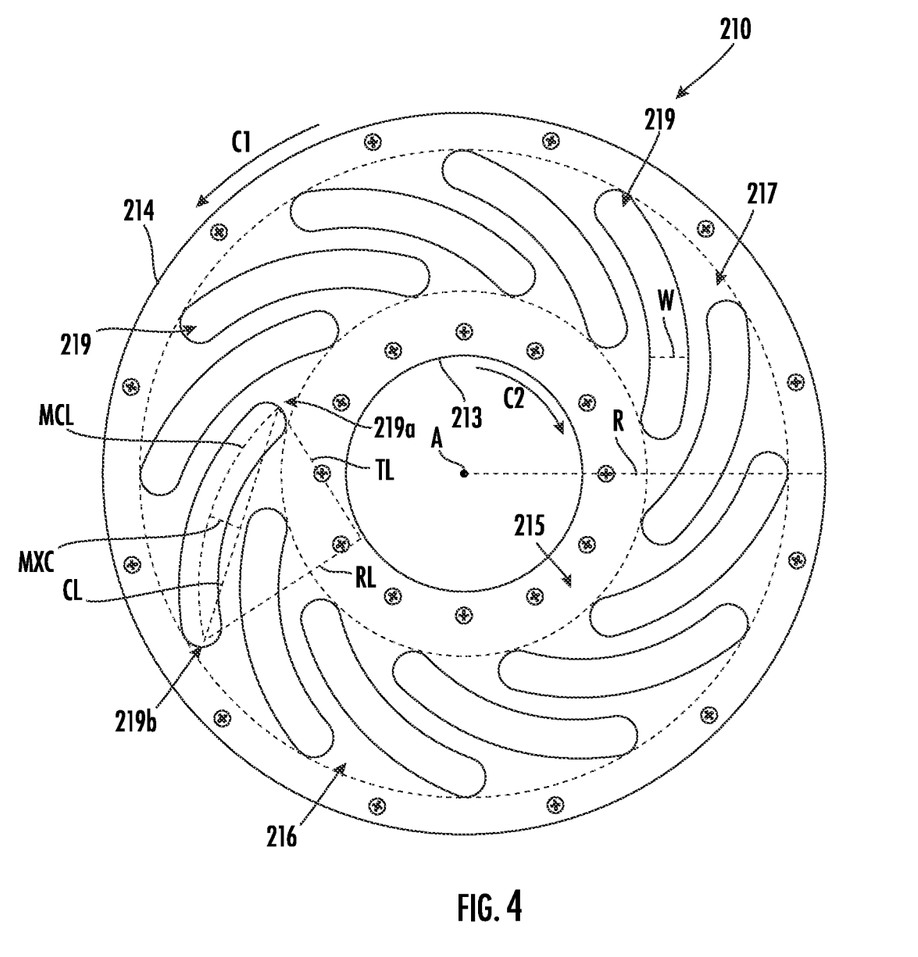
FIG. 4 provides a top view of a spiral flexure of the flexure assembly of FIG. 3, in accordance with an example embodiment.

Referring now to FIG. 4, a top view of the first spiral flexure 210 of the flexure assembly 200 of FIG. 3 is provided, in accordance with an example embodiment. As discussed, the first spiral flexure 210 and the second spiral flexure 240 can be configured the same, or similarly. Therefore, for brevity, only the first spiral flexure 210 will be described in detail.

As also discussed, the first spiral flexure 210 can include a plurality of slots 219. Each of the slots 219 can extend from the inner portion 215 of the first spiral flexure 210 to the outer portion 216 of the first spiral flexure 210. Each of the plurality of slots 219 can have a first end 219a that is within the inner portion 215 of the first spiral flexure 210 and a second end 219b that is within the outer portion 216 of the first spiral flexure 210.

Each of the plurality of slots 219 can define a chord line CL that extends linearly from the first end 219a to the second end 219b. Each of the plurality of slots 219 can define a mean camber line MCL that extends nonlinearly from the first end 219a to the second end 219b. For example, the mean camber line MCL can extend nonlinearly and be equidistant from the longitudinal periphery of the slot 219. Stated differently, the mean camber line MCL can longitudinally bisect, or substantially longitudinally bisect, the slot 219.

In various examples, and as depicted in FIG. 4, the mean camber line MCL can be an arc of a perfect circle, which results in a slot 219 that is shaped like an arc of a perfect circle. However, in various other examples, the mean camber line MCL can be an arc of an oval, which results in a slot 219 that is shaped like an arc of an oval. In yet other examples, the mean camber line MCL can have various other shapes, such as serpentine shaped, chevron shaped, etc. In various examples, each of the plurality of slots 219 can be shaped substantially similar (e.g., within manufacturing tolerances, such as within 30 mil, such as within 15 mil, such as within 5 mil). As such, in various examples, the mean camber line MCL of each the plurality of slots 219 can be substantially similar.

As will be appreciated, having a slot 219 that is nonlinear, such as a curved slot 219, has various benefits. For example, compared to a linear slot, the nonlinear slot 219 has a longer length, which results in less axial stiffness but potentially more torsional and radial stiffness. As such, as compared to a flexure assembly with linear slots, the flexure assembly 200 provides more flexibility in the axial directions D1, D2, and more stiffness in the circumferential direction C and the radial directions R.

The chord line CL and the mean camber line MCL can define a maximum camber line MXC that extends orthogonally from the chord line CL towards the mean camber line MCL at a point where the distance is the greatest. In various examples, and as depicted in the example of FIG. 4, the maximum camber line MXC is at the midpoint of the chord line CL.

In various examples, a ratio (CL:MXC) between the length of the chord line CL and the length of the maximum camber line MXC of each of the plurality of slots 219 can be at least 3:50 and up to 25:50, such as at least 3:50 and up to 12:50, such as at least 5:50 and up to 9:50, such as at least 6:50 and up to 8:50, such as approximately 7:50.

The second end 219b of each of the plurality of slots 219 can define a radial line RL and the first end 219a of each of the plurality of slots 219 can define a tilt line TL. The tilt line TL can extend from the first end 219a and toward the radial line RL and can be orthogonal to the radial line RL. The radial line RL can extend radially inward from the second end 219b and to the tilt line TL. A ratio (TL:RL) can be defined by the tilt line TL and the radial line RL. In various examples, the TL:RL ratio is greater than 0 such that each of the plurality of slots 219 is tilted in relation to the radial line RL. In various examples, the TL:RL ratio is at least 10:25 and up to 30:25, such as at least 17:25 and up to 25:25, such as at least 20:25 and up to 22:25, such as approximately 21:25. The tilted configuration of each of the plurality of slots 219 allows each slot 219 to be longer. As such, as compared to a non-tilted configuration, the tilted configuration allows more flexibility in the axial directions D1, D2.

The plurality of slots 219 can define a circumferentially extending slot area 217 that is defined by the radial peripheries of each of the plurality of slots 219. The face of the first spiral flexure 210 can have a total surface area and the area of the slot area 217 can be at least 40 percent of the total surface area, such as at least 30 percent and up to 90 percent, such as at least 40 percent and up to 80 percent of the total surface area. As will be appreciated, having a larger slot area 217 may increase the flexibility of the first spiral flexure 210 in the axial directions D1, D2.

In various examples, and as depicted in FIG. 4, the slot area 217 can be positioned closer to the outer rim 214 than the inner rim 213. When the slots 219 have a tilted configuration, as depicted in FIG. 4, positioning the slot area 217 closer to the outer rim 214 may result in a more even flexibility in different radial positions of the first spiral flexure 210.

The first spiral flexure 210 can define a radius R that extends from the axis A to the outer rim 214. Each of the plurality of slots 219 can define a width W. A ratio (R:W) between the radius of the first spiral flexure 210 and the width of each of the plurality of slots 219 can be at least 5:1 and up to 14:1, such as at least 7:1 and up to 12:1, such as at least 7:1 and up to 10:1, such as at least 9:1 and up to 10:1. As will be appreciated, having a low ratio (R:W) between the radius of the first spiral flexure 210 and the width of each of the plurality of slots 219 can result in an increased flexibility of the first spiral flexure 210 in the axial directions D1, D2.

In various examples, each of the plurality of slots 219 can be approximately equally circumferentially spaced (e.g., within two degrees, such as within one degree circumferentially). For example, when there are 12 slots, as depicted in FIG. 4, a slot of the plurality of slots 219 can be positioned approximately every 30 degrees circumferentially around the axis A; when there are 10 slots, a slot of the plurality of slots can be positioned every 36 degrees circumferentially around the axis A; when there are 15 slots, a slot of the plurality of slots can be positioned every 24 degrees circumferentially around the axis A; and so forth. Configuring the plurality of slots 219 so that they are equally circumferentially spaced may result in a more even flexibility of the first spiral flexure 210 in different circumferential positions of the first spiral flexure 210.

Figure 5:
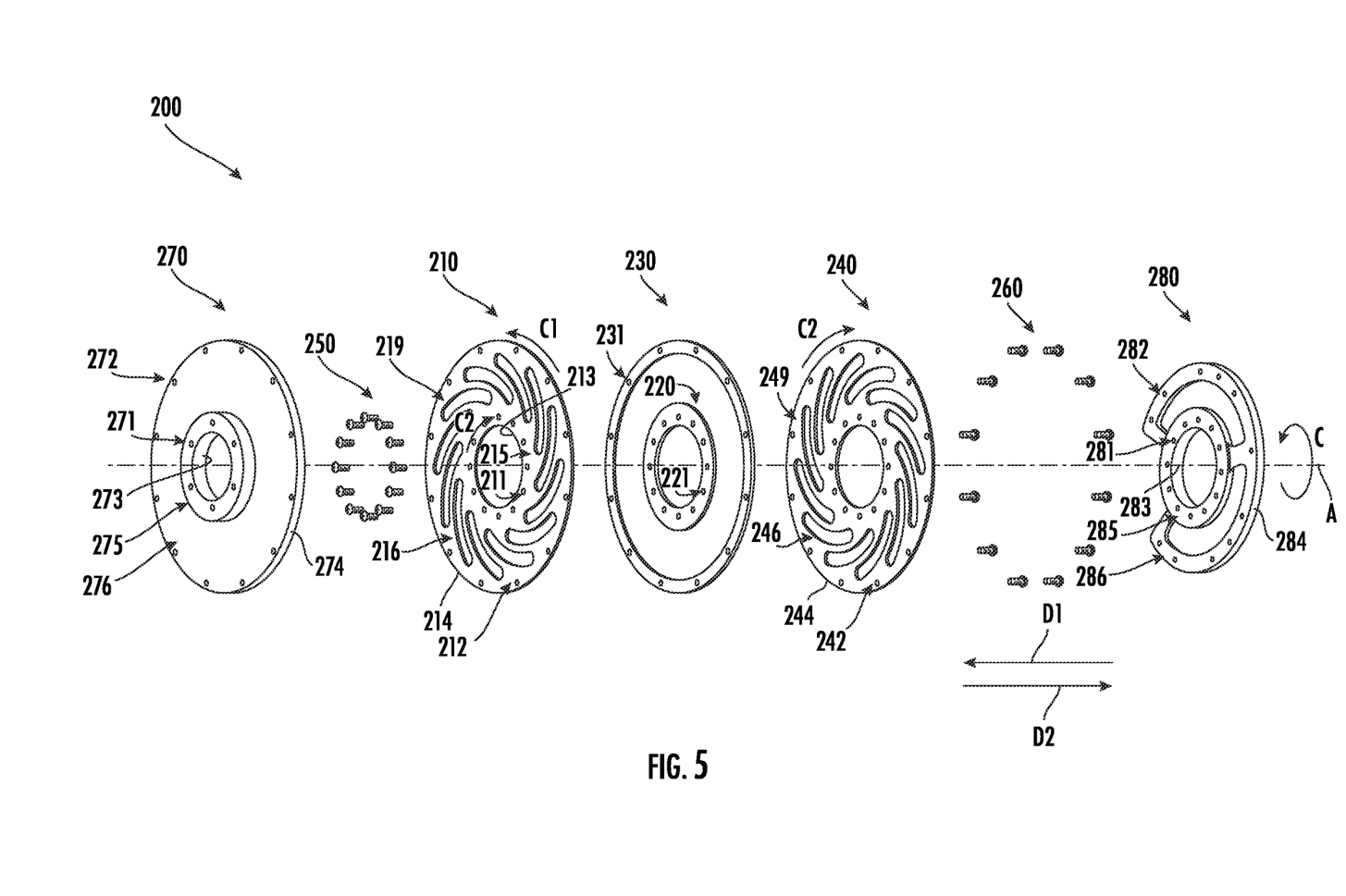
FIG. 5 provides an exploded, perspective view of a flexure assembly, in accordance with an example embodiment.

Referring now to FIG. 5, an exploded, perspective view of a flexure assembly 200 is provided, in accordance with an example embodiment. The flexure assembly 200 of FIG. 5 can be similar to, or the same as, the flexure assembly 200 of FIG. 3 except that the flexure assembly 200 includes a first plate 270 and a second plate 280. The first plate 270 can be configured to coupled, directly or indirectly, to the payload assembly 110 and the second plate 280 can be configured to couple, directly or indirectly, to the yoke assembly 120 (e.g., the mount assembly 121 of the yoke assembly 120). The first plate 270 and the second plate 280 can be any shape or size.

In various examples, and as depicted in FIG. 5, the first plurality of fasteners 250, the first spiral flexure 210, the first spacing element 220, the second spacing element 230, the second spiral flexure 240, and the second plurality of fasteners 260 are positioned between the first plate 270 and the second plate 280.

The first plurality of fasteners 250 can extend through the first spiral flexure 210, the first spacing element 220, the second spiral flexure 240, and the second plate 280. The second plurality of fasteners 260 can extend through the second spiral flexure 240, the second spacing element 230, the first spiral flexure 210, and the first plate 270. Notably, in various examples, and as depicted in FIG. 5, the first plurality of fasteners 250 do not extend through the second spacing element 230 or the first plate 270 and the second plurality of fasteners 260 do not extend through the first spacing element 220 or the second plate 280. As will be explained, this configuration may allow for the first plate 270 and the second plate 280 to move in relation to each other in the axial directions D1, D2. For example, this configuration may allow for the first plate 270 to move axially relative to the second plate 280 and/or for the second plate 280 to move axially relative to the first plate 270.

Referring still to FIG. 5, the first spiral flexure 210 and the second spiral flexure 240 can be oriented within the flexure assembly 200 such that they are counterposed. For example, the orientation of the second spiral flexure 240 can be the same as the first spiral flexure 210 except that it is flipped 180 degrees on an axis that extends radially from the axis A. This counterposed configuration has various benefits. For example, the first spiral flexure 210 and the second spiral flexure 240 may exert opposite circumferential forces onto the first spacing element 220 and/or the second spacing element 230. The opposite circumferential forces may maintain the radial and circumferential positioning of the first spacing element 220 in relation to the second spacing element 230 while allowing the axial movement of the first spacing element 220 in relation to the second spacing element 230. Similarly, the opposite circumferential forces may maintain the radial and circumferential positioning of the first plate 270 in relation to the second plate 280 while allowing the axial movement of the first plate 270 in relation to the second plate 280. Allowing axial position changes while maintaining the radial circumferential position may be beneficial for accommodating the thermal expansion of the various components of the payload assembly 110 and the yoke assembly 120 of the gimbal assembly 100 (FIGS. 1 and 2), while also minimizing the amount of movement of the payload assembly 110 that is caused by thermal expansion.

Figure 6:
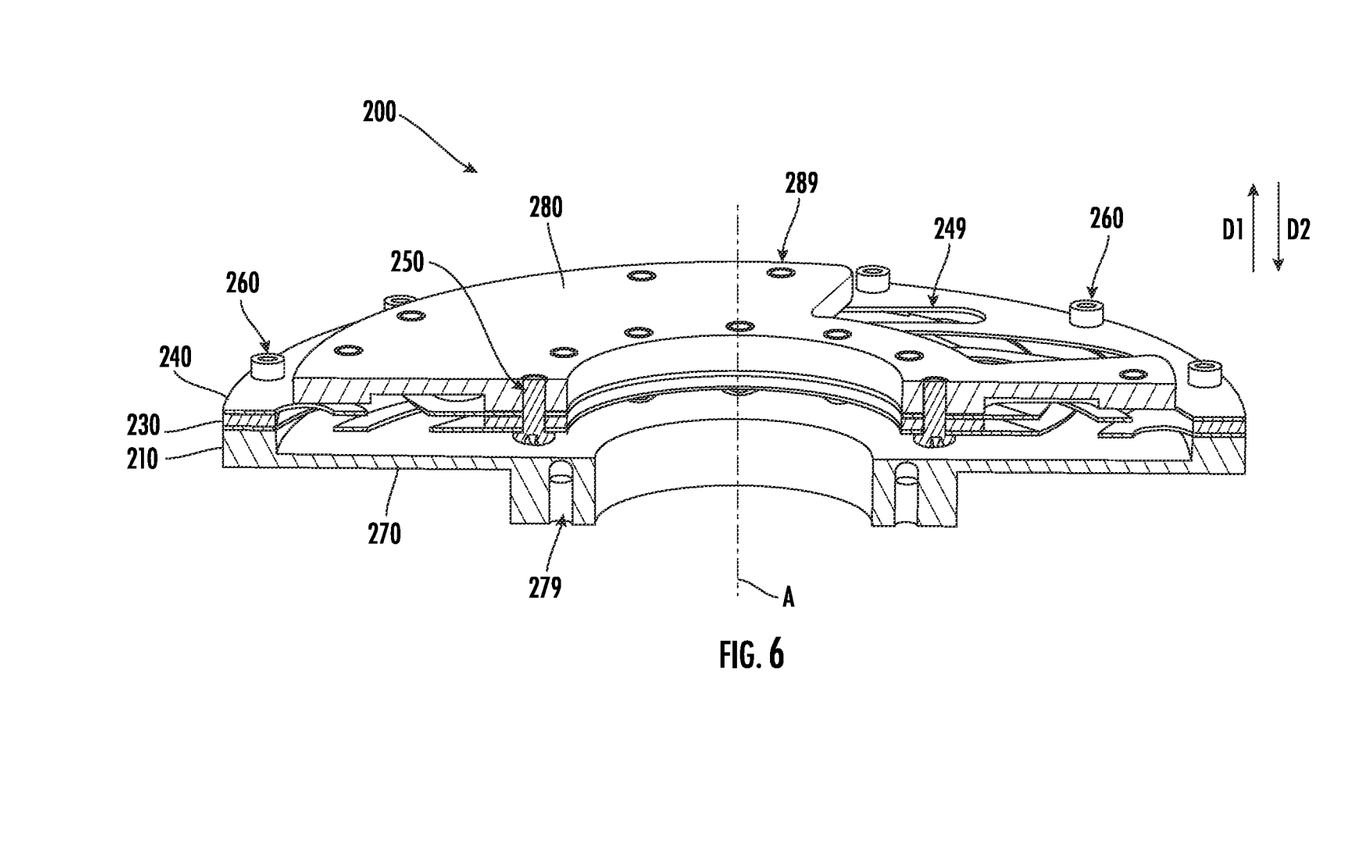
FIG. 6 provides a cross-sectional, perspective view of the flexure assembly of FIG. 5, in accordance with an example embodiment.

Referring now to FIG. 6, a cross-sectional, perspective view of the flexure assembly 200 of FIG. 5 is provided, in accordance with an example embodiment. The flexure assembly 200 can include a third plurality of fasteners 279 that extends at least partially through the first plate 270 and a fourth plurality of fasteners 289 that extends at least partially through the second plate 280. Notably, neither the third plurality of fasteners 279 nor the fourth plurality of fasteners 289 extend through the first spiral flexure 210, the first spacing element 220, the second spacing element 230, or the second spiral flexure 240. The third plurality of fasteners 279 and the fourth plurality of fasteners 289 can be configured to couple the flexure assembly 200 to adjacent components or assemblies. For example, the third plurality of fasteners 279 can be configured to couple, directly or indirectly, the flexure assembly 200 to the payload assembly 110 and the fourth plurality of fasteners 289 can be configured to couple, directly or indirectly, the flexure assembly 200 to the yoke assembly 120 (e.g., the mount assembly 121 of the yoke assembly 120).

Referring to FIG. 1 and FIG. 2, the gimbal assembly 100 that includes the at least one flexure assembly 200 has various benefits. As discussed, the gimbal assembly 100 may experience changes in temperature that may cause materials of various components of the gimbal assembly 100 to expand or contract. The expansion or contraction of the materials of various components of the gimbal assembly 100 may cause the payload assembly 110 to move closer to, or further away from, the yoke assembly 120 (e.g., the mount assembly 121 of the yoke assembly 120) in the axial direction. Incorporating the flexure assembly 200 between the payload assembly 110 and the yoke assembly 120 may reduce the damage and material fatigue caused by the expansion and contraction of materials by allowing the payload assembly 110 to move axially in relation to the yoke assembly 120. Stated differently, the payload assembly 110 and the yoke assembly 120 of the gimbal assembly 100 may experience stress when the components thermally expand and contract. However, the flexure assembly 200 may reduce the amount of stress experienced by the payload assembly 110 and the yoke assembly 120 when the components thermally expand and contract by allowing the payload assembly 110 to move axially.

Additionally, incorporating the flexure assembly 200 may prevent the circumferential and radial movement of the payload assembly 110 relative to the yoke assembly 120 when thermally expanding and contracting. Preventing the circumferential and radial movement of the payload assembly 110 in response to thermal expansion and contraction may be beneficial because equipment that is coupled to the payload assembly 110 may require precise positioning that may be negatively affected by circumferential and radial movement of the payload assembly 110. Therefore, incorporating the flexure assembly 200 into a gimbal assembly 100 pay result in the equipment that is coupled to the payload assembly 110 to have an increased positioning precision.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A flexure assembly that defines an axis, wherein the axis defines an axial direction, a circumferential direction, and a radial direction, the flexure assembly comprising:
    a first spiral flexure that comprises an annular body comprising a central opening coaxial with the axis and a plurality of slots circumferentially-spaced about the axis and axially-extending therethrough;
    a second spiral flexure that comprises an annular body comprising a central opening coaxial with the axis and a plurality of slots circumferentially-spaced about the axis and axially-extending therethrough;
    a first spacing element positioned between the first spiral flexure and the second spiral flexure;
    a second spacing element positioned between the first spiral flexure and the second spiral flexure;
    a first plurality of fasteners circumferentially-spaced around the axis, wherein each of the first plurality of fasteners axially extends through radially inner portions of the first spiral flexure, the first spacing element, and radially inner portions of the second spiral flexure;
    a second plurality of fasteners circumferentially-spaced around the axis, wherein each of the second plurality of fasteners axially extends through radially outer portions of the first spiral flexure, the second spacing element, and radially outer portions of the second spiral flexure;
    a first plate; and
    a second plate,
    wherein the first spiral flexure, the first spacing element, the second spacing element, and the second spiral flexure are each positioned between the first plate and the second plate, and
    wherein each of the first plurality of fasteners extends through either the first plate or the second plate, but not both, and each of the second plurality of fasteners extends through the other of the first plate or the second plate, but not both.

2. The flexure assembly of claim 1, wherein the first spiral flexure and the second spiral flexure are oriented within the flexure assembly such that they are counterposed.

3. The flexure assembly of claim 1, wherein the first plate is configured to move in the axial direction relative to the second plate.

4. The flexure assembly of claim 1, wherein the first spacing element is positioned between the radially inner portions of the first spiral flexure and the radially inner portions of the second spiral flexure, wherein the second spacing element is positioned between the radially outer portions of the first spiral flexure and the radially outer portions of the second spiral flexure, wherein the first spacing element is configured to move relative to the second spacing element.

5. The flexure assembly of claim 1, wherein each of the plurality of slots of the first spiral flexure and the second spiral flexure are nonlinear.

6. The flexure assembly of claim 5, wherein each of the plurality of slots of the first spiral flexure and the second spiral flexure are arc shaped.

7. The flexure assembly of claim 1, wherein each of the plurality of slots have a tilted configuration relative to the radial direction.

8. The flexure assembly of claim 1, wherein the first spiral flexure defines a radius that extends from the axis to an outer rim of the first spiral flexure, wherein each of the plurality of slots of the first spiral flexure define a width, wherein a ratio (R:W) between the radius of the first spiral flexure and the width is at least 5:1 and up to 14:1.

9. The flexure assembly of claim 1, wherein the first spiral flexure and the second spiral flexure each have a thickness that is less than 0.1 inch.

10. A gimbal assembly comprising:
    a yoke assembly;
    a payload assembly that is rotatably coupled to the yoke assembly; and
    a flexure assembly positioned between the payload assembly and the yoke assembly, wherein the flexure assembly defines an axis, wherein the axis defines an axial direction, a circumferential direction, and a radial direction, the flexure assembly comprising:
        a first spiral flexure that comprises an annular body comprising a central opening coaxial with the axis and a plurality of slots circumferentially-spaced about the axis and axially-extending therethrough;
        a second spiral flexure that comprises an annular body comprising a central opening coaxial with the axis and a plurality of slots circumferentially-spaced about the axis and axially-extending therethrough;
        a first spacing element positioned between the first spiral flexure and the second spiral flexure;
        a second spacing element positioned between the first spiral flexure and the second spiral flexure;
        a first plurality of fasteners circumferentially-spaced around the axis, wherein each of the first plurality of fasteners axially extends through radially inner portions of the first spiral flexure, the first spacing element, and radially inner portions of the second spiral flexure;
        a second plurality of fasteners circumferentially-spaced around the axis, wherein each of the second plurality of fasteners axially extends through radially outer portions of the first spiral flexure, the second spacing element, and radially outer portions of the second spiral flexure;
        a first plate; and
        a second plate,
        wherein the first spiral flexure, the first spacing element, the second spacing element, and the second spiral flexure are each positioned between the first plate and the second plate, and wherein each of the first plurality of fasteners extends through either the first plate or the second plate, but not both, and each of the second plurality of fasteners extends through the other of the first plate or the second plate, but not both.

11. The gimbal assembly of claim 10, wherein the first spiral flexure and the second spiral flexure are oriented within the flexure assembly such that they are counterposed.

12. The gimbal assembly of claim 10, wherein the first plate is configured to move in the axial direction relative to the second plate.

13. The gimbal assembly of claim 10, wherein the first spacing element is positioned between the radially inner portions of the first spiral flexure and the radially inner portions of the second spiral flexure, wherein the second spacing element is positioned between the radially outer portions of the first spiral flexure and the radially outer portions of the second spiral flexure, wherein the first spacing element is configured to move relative to the second spacing element.

14. The gimbal assembly of claim 10, wherein each of the plurality of slots of the first spiral flexure and the second spiral flexure are nonlinear.

15. The gimbal assembly of claim 14, wherein each of the plurality of slots of the first spiral flexure and the second spiral flexure are arc shaped.

16. The gimbal assembly of claim 10, wherein each of the plurality of slots have a tilted configuration relative to the radial direction.

17. The gimbal assembly of claim 10, wherein the first spiral flexure defines a radius that extends from the axis to an outer rim of the first spiral flexure, wherein each of the plurality of slots of the first spiral flexure define a width, wherein a ratio (R:W) between the radius of the first spiral flexure and the width is at least 5:1 and up to 14:1.

18. The gimbal assembly of claim 10, wherein the first spiral flexure and the second spiral flexure each have a thickness that is less than 0.1 inch.

* * * * *